US008981254B2

(12) United States Patent
Pitz et al.

(10) Patent No.: US 8,981,254 B2
(45) Date of Patent: Mar. 17, 2015

(54) METHOD AND APPARATUS FOR RE-IMAGING A PREVIOUSLY USED PRINTING FORM

(75) Inventors: Heiner Pitz, Weinheim (DE); Bernhard Mechler, Heidelberg (DE); Rolf Spilger, Viernheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 226 days.

(21) Appl. No.: 13/192,983

(22) Filed: Jul. 28, 2011

(65) Prior Publication Data

US 2012/0032376 A1 Feb. 9, 2012

(30) Foreign Application Priority Data

Aug. 4, 2010 (DE) ........................ 10 2010 033 337

(51) Int. Cl.

*B23K 26/00* (2014.01)
*B29C 35/08* (2006.01)
*H05B 6/00* (2006.01)
*B08B 3/00* (2006.01)

(Continued)

(52) U.S. Cl.

CPC ..................................... *B41N 3/006* (2013.01)
USPC .............. 219/121.6; 219/121.68; 219/121.69; 219/121.85; 264/400; 264/482; 134/64 P; 134/122 P; 101/450.1; 101/451; 101/453; 101/454; 101/458; 101/463.1; 101/465; 101/467; 101/423; 101/424; 101/425

(58) Field of Classification Search

USPC ............... 219/121.68, 121.69, 121.85, 121.6; 264/400, 482; 134/64 P, 122 P; 427/554–556; 347/224; 101/450.1, 101/451, 453, 454, 458, 463.1, 465, 467, 101/423–425, 216, 401.1

See application file for complete search history.

(56) References Cited

U.S. PATENT DOCUMENTS 3,741,118 A * 6/1973 Carley .......................... 101/451
3,973,845 A * 8/1976 Lindblad et al. .............. 399/350

(Continued)

FOREIGN PATENT DOCUMENTS

CN 1190293 C 2/2005
CN 1830682 A 9/2006

(Continued)

OTHER PUBLICATIONS

German Patent and Trademark Office Search Report, Dated Apr. 13, 2011.

*Primary Examiner* — Dana Ross
*Assistant Examiner* — Gyounghyun Bae
(74) *Attorney, Agent, or Firm* — Laurence A. Greenberg; Werner H. Stemer; Ralph E. Locher

(57) ABSTRACT

In a method for re-imaging a printing form that has been used for printing in a prior printing process a substrate of the printing form is cleaned globally of ink or varnish and the substrate is treated abrasively globally in order to erase a preceding printing image. The substrate to be imaged with a new printing image is treated locally in image regions with a pulsed laser beam and, in the process, a nanoscopic and hydrophobic surface structure is produced locally. The substrate is treated globally with a hydrophilicity intensifier, as a result of which the substrate becomes hydrophilic locally in the previously hydrophobic image regions. An apparatus has a corresponding erasing unit and an imaging unit with a femtosecond laser.

13 Claims, 1 Drawing Sheet

(51) Int. Cl.

| | |
|---|---|
| ***B41F 1/18*** | (2006.01) |
| ***B41N 1/00*** | (2006.01) |
| ***B41M 5/00*** | (2006.01) |
| ***B41F 35/00*** | (2006.01) |
| ***B41N 3/00*** | (2006.01) |

(56) References Cited

U.S. PATENT DOCUMENTS

| | | | | |
|---|---|---|---|---|
| 4,007,982 | A * | 2/1977 | Stange | 399/351 |
| 4,081,653 | A * | 3/1978 | Koo et al. | 219/121.68 |
| 4,111,546 | A * | 9/1978 | Maret | 399/349 |
| 4,555,475 | A | 11/1985 | Gamson et al. | |
| 4,718,340 | A * | 1/1988 | Love, III | 101/116 |
| 4,729,310 | A * | 3/1988 | Love, III | 101/157 |
| 5,260,756 | A * | 11/1993 | Yanai et al. | 399/350 |
| 5,404,209 | A * | 4/1995 | Matsuoka et al. | 399/249 |
| 5,855,835 | A * | 1/1999 | Gordon et al. | 264/400 |
| 6,024,019 | A * | 2/2000 | Williams et al. | 101/463.1 |
| 6,125,756 | A | 10/2000 | Nüssel et al. | |
| 6,352,811 | B1 * | 3/2002 | Patel et al. | 430/270.1 |
| 6,497,178 | B1 * | 12/2002 | Rorke et al. | 101/457 |
| 6,568,325 | B2 * | 5/2003 | Sawada et al. | 101/459 |
| 6,588,340 | B2 * | 7/2003 | Friedman | 101/467 |
| 6,760,973 | B1 * | 7/2004 | Koide | 29/890.1 |
| 6,833,225 | B2 * | 12/2004 | Ooishi | 430/19 |
| 6,997,108 | B2 * | 2/2006 | Tabuchi et al. | 101/217 |
| 7,044,583 | B2 | 5/2006 | Marten et al. | |
| 7,100,503 | B2 | 9/2006 | Wiedemer et al. | |
| 7,194,956 | B2 * | 3/2007 | Mori et al. | 101/467 |
| 7,277,651 | B2 * | 10/2007 | Hanamoto et al. | 399/69 |
| 7,485,397 | B2 * | 2/2009 | Eck et al. | 430/19 |
| 7,582,328 | B2 * | 9/2009 | Rupich et al. | 427/62 |
| 7,758,927 | B2 * | 7/2010 | Miner et al. | 427/555 |
| 7,841,278 | B2 | 11/2010 | Schlörholz et al. | |
| 2002/0011167 | A1 | 1/2002 | Figov et al. | |
| 2004/0007146 | A1 | 1/2004 | Gutfleisch et al. | |
| 2006/0159838 | A1 * | 7/2006 | Kowalski et al. | 427/58 |
| 2006/0286785 | A1 * | 12/2006 | Rogers et al. | 438/584 |
| 2007/0269745 | A1 | 11/2007 | Strehmel et al. | |
| 2008/0008822 | A1 * | 1/2008 | Kowalski et al. | 427/58 |
| 2008/0020304 | A1 * | 1/2008 | Schroder et al. | 430/39 |
| 2009/0212292 | A1 * | 8/2009 | Hayton et al. | 257/66 |
| 2009/0303654 | A1 * | 12/2009 | Fan et al. | 361/229 |
| 2010/0059863 | A1 * | 3/2010 | Rogers et al. | 257/619 |

FOREIGN PATENT DOCUMENTS

| | | | |
|---|---|---|---|
| CN | 101204868 | A | 6/2008 |
| DE | 2553965 | A1 | 7/1976 |
| DE | 44 26 012 | A1 | 1/1996 |
| DE | 101 32 204 | A1 | 1/2003 |
| DE | 102 44 766 | A1 | 5/2003 |
| DE | 102 27 054 | A1 | 12/2003 |
| DE | 10 2004 055 733 | B3 | 5/2006 |
| DE | 10 2005 035 896 | A1 | 2/2007 |
| EP | 1285750 | A2 | 2/2003 |
| JP | H06214432 | A | 8/1994 |
| WO | 99/36266 | A1 | 7/1999 |
| WO | 2010/029342 | A1 | 3/2010 |

* cited by examiner

FIG. 1
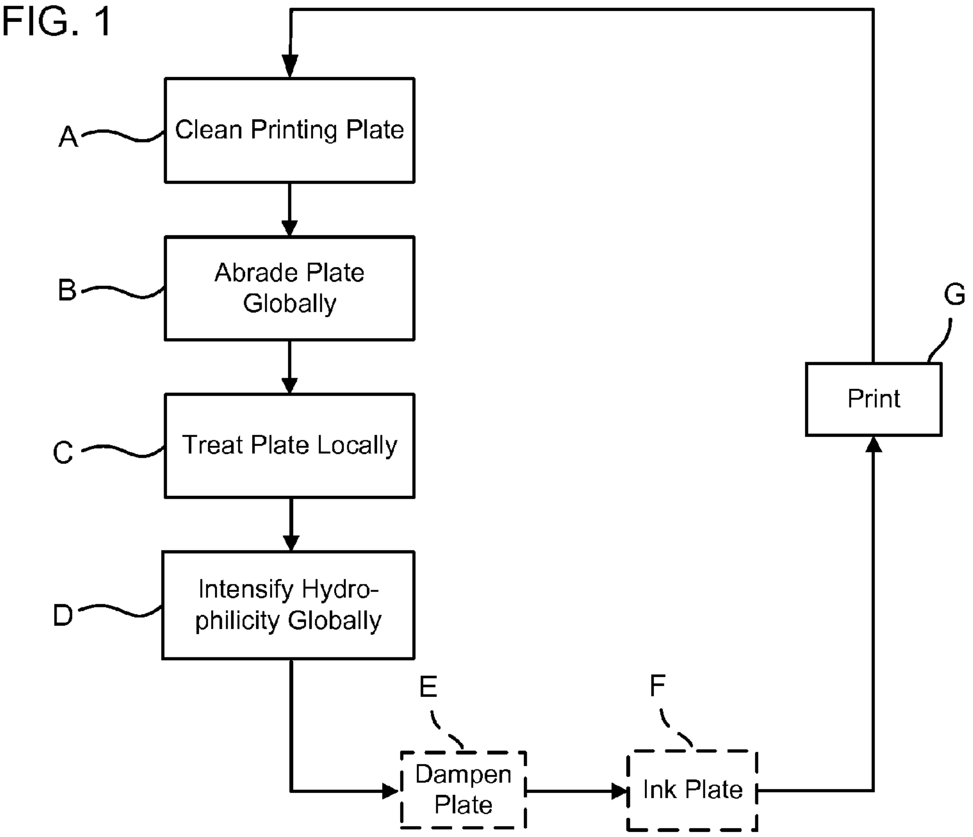
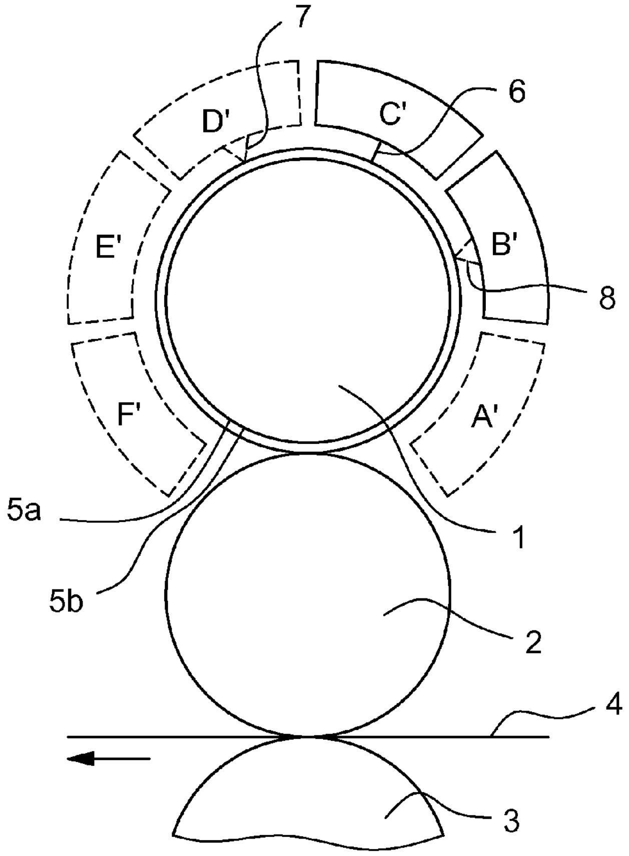
FIG. 2

METHOD AND APPARATUS FOR RE-IMAGING A PREVIOUSLY USED PRINTING FORM

CROSS-REFERENCE TO RELATED APPLICATION

This application claims the priority, under 35 U.S.C. §119, of German patent application DE 10 2010 033 337.9, filed Aug. 4, 2010; the prior application is herewith incorporated by reference in its entirety.

BACKGROUND OF THE INVENTION

Field of the Invention

The present invention relates to a method for re-imaging a used printing form and also to a device for re-imaging a printing form that has been used for printing.

The prior art discloses rewritable printing forms for offset printing, i.e. printing forms which can be provided repeatedly with changing printing images and thus can be reused. Such printing forms can have a substrate and a micrometer-thick coating applied thereto, wherein the coating is removed locally in the image regions during imaging, normally by means of laser radiation, so that structuring of the surface into hydrophilic and hydrophobic regions in accordance with an image is carried out. Before renewed imaging, the surface is cleaned and once more provided with a complete coating. The coating can be formed as a water film, for example, as described in U.S. Pat. No. 7,100,503 B2 and its counterpart German published patent application DE 101 32 204 A1. In addition, printing forms are known, for example from the commonly assigned German published patent application DE 102 27 054 A1, which, instead of the aforementioned micrometer-thick coating, have a molecular covering which is only nanometer thick, which likewise can be structured by means of laser radiation and is refreshed before renewed imaging. On the other hand, a printing form which manages without any coating and covering media, and also corresponding application apparatus, are desirable.

International patent application publication WO 2010/029342 A1 describes a rewritable printing form which has neither a coating nor a covering. The printing form is acted on with laser radiation, for example radiation from a femtosecond laser, in image regions and, as a result, is adequately hydrophilized locally in order to produce structuring in accordance with an image. The erasing of the printing form is carried out, for example, by means of adequately long storage and preferably without the use of a liquid solvent. Such storage can be viewed as a disadvantage when the printing form, after it has been used for printing, is intended to be available immediately again for a new print job.

In connection with the production of different-color or holographically active structures, German published patent application DE 10 2005 035 896 A1 further describes the production of nanostructures by using femtosecond lasers. However, the use of such structures for producing printing forms and, in particular, erasing the structures before re-imaging are not described.

SUMMARY OF THE INVENTION

It is accordingly an object of the invention to provide a method and device which overcome the above-mentioned disadvantages of the heretofore-known devices and methods of this general type and which provides for an improved method that makes it possible to keep down the expenditure on time and cost for the re-imaging and, at the same time, in particular for the erasing. Furthermore, it is a further or alternative object of the present invention to devise an apparatus that is improved with respect to the prior art which likewise makes it possible to keep down the afore-mentioned expenditure.

With the foregoing and other objects in view there is provided, in accordance with the invention, a method of re-imaging a previously used printing form (i.e., a printing form that has been used in a previous printing process). The method comprises the following steps:

globally cleaning a substrate of the printing form of ink or varnish disposed thereon;

abrasively treating the substrate globally in order to erase a printing image used in a prior printing process;

locally treating image regions of the substrate to be imaged with a new printing image with a pulsed laser beam to thereby produce a locally defined nanoscopic and hydrophobic surface structure; and treating the substrate globally with a hydrophilicity intensifier, to thereby render the substrate locally hydrophilic in previously hydrophobic image regions.

A method according to the invention for re-imaging a printing form that has been used for printing is a method wherein the substrate of the printing form is cleaned globally of ink or varnish, the substrate is treated abrasively globally in order to erase a preceding printing image, the substrate to be imaged with a subsequent printing image is treated locally in image regions with a pulsed laser beam and, in the process, a nanoscopic and hydrophobic surface structure is produced locally, and the substrate is treated globally with a hydrophilicity intensifier, as a result of which the substrate becomes hydrophilic locally in the previously hydrophobic image regions.

The method according to the invention uses a pulsed laser beam and thus laser pulses. Nanostructuring or nanotopography is advantageously produced on the surface of the substrate in the image regions, as a result of which the wetting behavior changes: the printing form becomes hydrophobic in the imaged regions, i.e. the image regions. A substantial removal of material (ablation) or application of material (coating) is not carried out in the process; instead the same substrate material is found in image regions and non-image regions but with a different nanostructure. The difference necessary to create the necessary printing contrast is brought about solely by the different nanoscopic structuring of the regions. In addition, the state of the surface created in this way is stable over time, as opposed for example to the structured water film described in the prior art, which can easily evaporate.

The method of the invention further uses a hydrophilicity intensifier. It has surprisingly been found that, following initial surface beading, the hydrophilicity intensifier adheres particularly well precisely in the nanostructured image regions (i.e. the molecules are anchored particularly well there) and, as a result, hydrophilizes these previously hydrophobic image regions. Otherwise than expected, therefore, following the hydrophilicity intensification, the laser-treated hydrophobic regions are more hydrophilic than the non-laser-treated regions. As a result, even if otherwise than expected, the contrast between imaged and non-imaged regions is advantageously adequately intensified.

A development of the method according to the invention that is advantageous for the production of high contrast between irradiated and non-irradiated regions and is therefore preferred can be distinguished by the fact that the pulsed laser beam comprises light pulses, the duration t of which lies at least in the picosecond range ($t<100*10^{-12}$ seconds) and preferably at least in the femtosecond range ($t<100*10^{-15}$ seconds). To this end, so-called short-pulse lasers may be used, in particular, picosecond lasers or femtosecond lasers.

A development of the method according to the invention that is likewise advantageous for the production of high contrast between irradiated and non-irradiated regions and is therefore preferred can be distinguished by the fact that the light pulses, with a pulse energy from about 1 to about 10 microjoule, last for about 10 to about 10,000, in particular about 100 to about 1000, femtoseconds.

A development of the method according to the invention that is advantageous for the imaging, i.e. structuring, of the substrate surface and is therefore preferred can be distinguished by the fact that the substrate is uncoated after the abrasive treatment and until the imaging, in particular the imaging can follow the abrasive treatment directly.

A development of the method according to the invention that is advantageous for the production of structuring adequate for the necessary printing contrast and is therefore preferred can be distinguished by the fact that the substrate is chosen from the list of the following substrates: metal, metal oxide, metal sheet, metal oxide layer on metal sheet, titanium sheet or titanium layer on stainless steel sheet, aluminum sheet or aluminum layer on stainless steel sheet, stainless steel sheet, plastic and plastic film. While the printing form, or printing forme, is described herein primarily as a printing plate, it will be noted that the printing form may also be an integral peripheral surface on a roller or a sleeve jacket of a press roller, or the like.

A development of the method according to the invention that is advantageous for adequate contrast intensification and is therefore preferred can be distinguished by the fact that the hydrophilicity intensifier used is a fluid gumming agent, in particular an aqueous solution of CMC (carboxymethyl cellulose).

A development of the method according to the invention that is advantageous on account of the ability thereof to be easily implemented industrially can be distinguished by the fact that a fluid scouring agent is used for the abrasive treatment.

With the above and other objects in view there is also provided, in accordance with the invention, an apparatus for re-imaging a printing form that has been previously used for printing. The novel apparatus comprises:

an erasing unit configured to erase from the printing form a printing image of a prior print process by treating a substrate of the printing form globally with a fluid scouring agent; and an imaging unit configured to treat the substrate to be imaged with a new printing image locally in image regions with a femtosecond laser.

In other words, an apparatus according to the invention for re-imaging a printing form that has been used for printing is distinguished by an erasing unit which, in order to erase a preceding printing image, treats the substrate of the printing form globally with a fluid scouring agent, and an imaging unit, which treats the substrate to be imaged with a subsequent printing image locally in image regions with a femtosecond laser.

A development of the apparatus according to the invention that is advantageous in order to achieve adequate contrast intensification and is therefore preferred can be distinguished by a developing unit which treats the substrate globally with a fluid gumming agent, as a result of which the substrate becomes hydrophilic locally in the image regions.

Also to be seen within the scope of the invention is a machine processing printing material, for example a printing press, in particular a sheet processing rotary press for lithographic offset printing or, for example, a printing plate exposer, which is distinguished by at least one apparatus as described above with reference to the invention.

The invention described and the advantageous developments of the invention that are described also constitute advantageous developments of the invention in combination with one another. Particularly preferred is a method in which global cleaning, global abrasive erasing by using a fluid scouring agent, local laser treatment of the uncoated metallic substrate with femtosecond pulses and global hydrophilicity intensification are carried out.

Other features which are considered as characteristic for the invention are set forth in the appended claims.

Although the invention is illustrated and described herein as embodied in a method for re-imaging a printing form that has been used for printing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a flowchart of a preferred exemplary embodiment of a method according to the invention; and FIG. 2 shows a schematic side view of a preferred exemplary embodiment of an apparatus according to the invention.

DETAILED DESCRIPTION OF THE INVENTION

Referring now to the figures of the drawing in detail and first, particularly, to FIG. 1 thereof, there is shown a flowchart of a preferred exemplary embodiment of a method according to the invention for re-imaging a printing form 5*a* that has previously been used for printing at least once. The previously imaged printing form 5*a* may be referred to as a “used” printing form. The re-imaging for a new print job can be carried out with the same or another printing image. The print job can be the printing of only one printing material, for example an individual sheet of paper or board, or the printing of a multiplicity of such printing materials, i.e. a sequence of such sheets.

In method step A, the substrate 5*b* of the printing form 5*a* (cf. FIG. 1), preferably a titanium or stainless steel sheet, is cleaned of ink or varnish from the preceding print job globally, i.e. at least substantially completely over the entire area used for printing. For this purpose, a commercially available printing plate cleaning agent, such as “Eurostar” from the DruckChemie company of Germany, for example can be used, i.e. applied and removed again with the ink or the varnish. Subsequent rinsing and drying can also be provided.

In method step B, the substrate 5*b* is treated globally abrasively in accordance with the invention in order to erase, i.e. irreversibly remove, a preceding printing image. To this end, use is preferably made of a fluid, in particular liquid scouring agent 8. The agent “RC95” from Agfa has been tested successfully. The treatment with the scouring agent has proven to be sufficient in tests to erase or to destroy the nanotopographic structuring of previous imaging and to transfer the surface of the printing form into a defined initial state for subsequent imaging.

In method step C, in order to be imaged with a subsequent printing image, the substrate 5*b* is treated in accordance with the invention locally (i.e. not globally but only where necessary for imaging) in image regions with a pulsed laser beam 6 (preferably what is known as a short-pulse or in particular femtosecond laser) and, in the process, a nanoscopic and hydrophobic, in particular (on account of its very low wetting characteristic with respect to water or aqueous solutions) what is known as a super-hydrophobic surface structure is created locally. The light pulses (with a pulse energy from about 1 to about 10 microjoule) preferably last for about 10 to about 10,000, in particular about 100 to about 1000 femtoseconds. In the process, nanotopographic structuring of the laser-treated surface is produced locally, with depressions from preferably about 10 to about 10,000 nm, in particular about 100 to about 1000 nm, and a lateral periodicity of the depressions of preferably about 10 to 10,000 nm, in particular about 100 to about 1000 nm. For example, use can be made of a titanium:sapphire laser (type RegA) from the Coherent company.

In method step D, the substrate 5*b* is treated globally with a hydrophilicity intensifier 7, as a result of which the substrate experiences reversal of the wetting characteristic locally according to the invention in the previously hydrophobic or even super-hydrophobic image regions and becomes hydrophilic. The hydrophilicity intensifier used is preferably a gum such as e.g. “850 Neutral Gum” from Kodak, “AgumZ”, “AgumO” or “AgumC2” from Agfa. A gum based on an aqueous solution of CMC (carboxymethyl cellulose) has proven to be particularly effective.

Following the re-imaging of the printing form that has previously already been used for printing, in accordance with method steps A to D, the printing form can be dampened in method step E and inked in method step F. Of particular advantage is the use of a dampening agent which contains a gum as a constituent part and therefore maintains the printing contrast, i.e. the difference in the wetting characteristic of the hydrophilic and hydrophobic regions that is adequate for the printing process, during continuous printing. Then, the printing form can be used for printing again in method step G. The cyclic process A to G can be run through repeatedly.

FIG. 2 shows a schematic side view of a preferred exemplary embodiment of an apparatus according to the invention for re-imaging a previously used printing form.

Units for treating the printing form 5*a* are arranged around a central cylinder 1, which is preferably formed as a printing form cylinder 1 and bears the printing form 5*a* and the substrate 5*b*.

The primarily important units of the apparatus according to the invention are the erasing unit B' which, in order to erase a preceding printing image, treats the substrate 5*b* of the printing form 5*a* globally with a fluid scouring agent 8, and the imaging unit C', which treats the substrate 5*b* to be imaged with a following printing image locally in image regions with a short-pulse laser C', preferably a femtosecond laser C'.

Optionally, the apparatus can further comprise a cleaning unit A', which cleans the substrate 5*b* of the printing form 5*a* globally of ink or varnish, and also a developing unit D', which treats the substrate 5*b* globally with a fluid gumming agent 7, as a result of which the substrate 5*b* becomes hydrophilic locally in the image regions.

Likewise optionally, a dampening unit E' for dampening the printing form in step E, above, and an inking unit F' for inking the printing form in step F, above, can also be arranged around the central cylinder 1. Printing from the printing form 5*a* can be carried out via a transfer cylinder 2 onto the printing material 4 in the gap between transfer cylinder 2 and an impression cylinder 3.

As an alternative to the method described, it is also possible for a printing form which has not yet been used for printing and has therefore not yet been inked to be imaged in accordance with method step C and hydrophilized or super-hydrophilized according to method step D without first cleaning the printing form of printing ink. The abrasive treatment according to method step B can optionally be provided in order to transfer the surface of the printing form into a defined initial state for the imaging.

The invention claimed is:

1. A method of re-imaging a previously used printing form, the method which comprises:
- globally cleaning a substrate of the printing form of ink or varnish disposed thereon;
- utilizing a fluid scouring agent for abrasively treating the substrate globally in order to erase a nanotopographic structuring of a previous printing image used in a prior printing process and to transfer a surface into a defined initial state for subsequent imaging;
- locally treating image regions of the substrate to be imaged with a new printing image with a pulsed laser beam to thereby produce a locally defined nanoscopic and hydrophobic surface structure by creating different nanostructuring in the substrate without a substantial removal of substrate material; and
- treating the substrate globally with a hydrophilicity intensifier, to thereby render the substrate locally hydrophilic in previously hydrophobic image regions.

2. The method according to claim 1, which comprises operating the pulsed laser beam with light pulses having a duration lying in a picosecond or femtosecond range.

3. The method according to claim 2, wherein the light pulses have a pulse energy from about 1 to about 10 microjoules and have a pulse duration from about 10 to about 10,000 femtoseconds.

4. The method according to claim 3, wherein the light pulses have a duration of about 100 to about 1000 femtoseconds.

5. The method according to claim 1, wherein the substrate is uncoated after the abrasive treatment and until the imaging.

6. The method according to claim 1, wherein the substrate is selected from the group consisting of:
- metal;
- metal oxide;
- metal sheet;
- metal oxide layer on metal sheet;
- titanium sheet or titanium layer on stainless steel sheet;
- aluminum sheet or aluminum layer on stainless steel sheet;
- stainless steel sheet;
- plastic; and
- plastic film.

7. The method according to claim 1, which comprises utilizing a fluid gumming agent as the hydrophilicity intensifier.

8. The method according to claim 7, wherein the fluid gumming agent is an aqueous solution of carboxymethyl cellulose.

9. An apparatus for re-imaging a printing form that has been previously used for printing, the apparatus comprising:
- an erasing unit configured to erase from the printing form a printing image of a prior print process by treating a substrate of the printing form globally with a fluid scouring agent for erasing a nanotopographic structuring of a previous printing image used in a prior printing process and to transfer a surface of the substrate into a defined initial state for subsequent imaging; and an imaging unit configured to treat the substrate to be imaged with a new printing image locally in image regions with a femtosecond laser, said imaging unit controlling said femtosecond laser to nanostructure the substrate by creating different nanostructuring in the substrate without a substantial removal of substrate material.

10. The apparatus according to claim 9, which further comprises a developing unit configured to treat the substrate globally with a fluid gumming agent, to thereby render the substrate hydrophilic locally in the image regions.

11. A printing press, comprising an apparatus according to claim 9 for re-imaging a previously used printing form.

12. The printing press according to claim 11, configured as a sheet processing rotary press for lithographic offset printing.

13. A printing plate exposer, comprising an apparatus according to claim 9 for re-imaging a previously used printing plate.

* * * * *